UNITED STATES PATENT OFFICE.

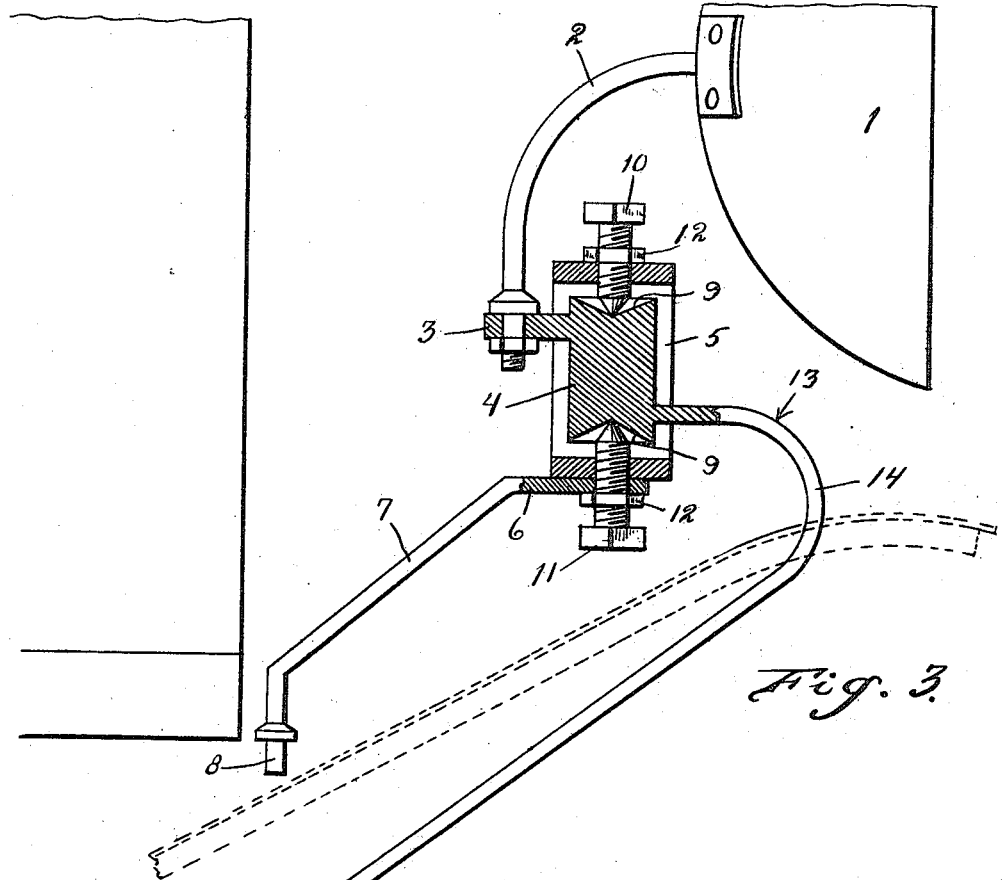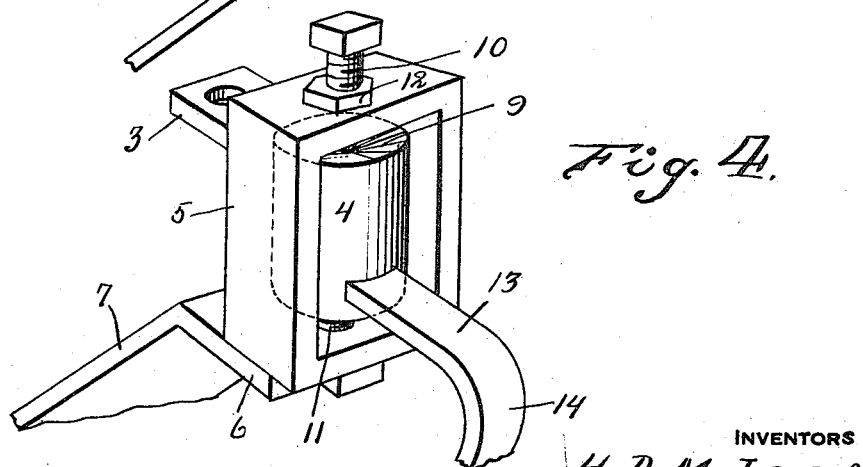

HARRY DENOON McLEAN AND CHARLES WARING, OF OLDS, ALBERTA, CANADA.

DIRIGIBLE HEADLIGHT.

1,241,410.  Specification of Letters Patent.  Patented Sept. 25, 1917.

Application filed May 29, 1917. Serial No. 171,796.

*To all whom it may concern:*

Be it known that we, HARRY DENOON McLEAN and CHARLES WARING, subjects of the King of Great Britain, residing at Olds, in the Province of Alberta and Dominion of Canada, have invented new and useful Improvements in Dirigible Headlights, of which the following is a specification.

This invention relates to dirigible headlamps for motor vehicles. The invention relates particularly to the means for turning the headlamps at angles corresponding with the angles assumed by the steering wheels of the vehicle, said turning movement of the lamps being automatically controlled by a member of the steering mechanism. The chief object of the invention is to provide lamp turning mechanism adapted for use on any make of motor vehicle but especially adapted to that type of machine in which the lamps are ordinarily supported in close proximity to opposite sides of the radiator, the construction hereinafter described providing for an ample turning movement of the lamps without interfering with the radiator and mud guards, without requiring a wide sweep of the lamps proper as has heretofore been found necessary in a great many instances.

With the above and other objects in view, the invention consists in the novel construction, combination and arrangement of parts, herein described, illustrated and claimed.

In the accompanying drawings:—

Fig. 3 is a vertical section on the line 3—3 of Fig. 2.

Fig. 4 is an enlarged perspective view illustrating the mounting of each of the lamps.

Figure 1:
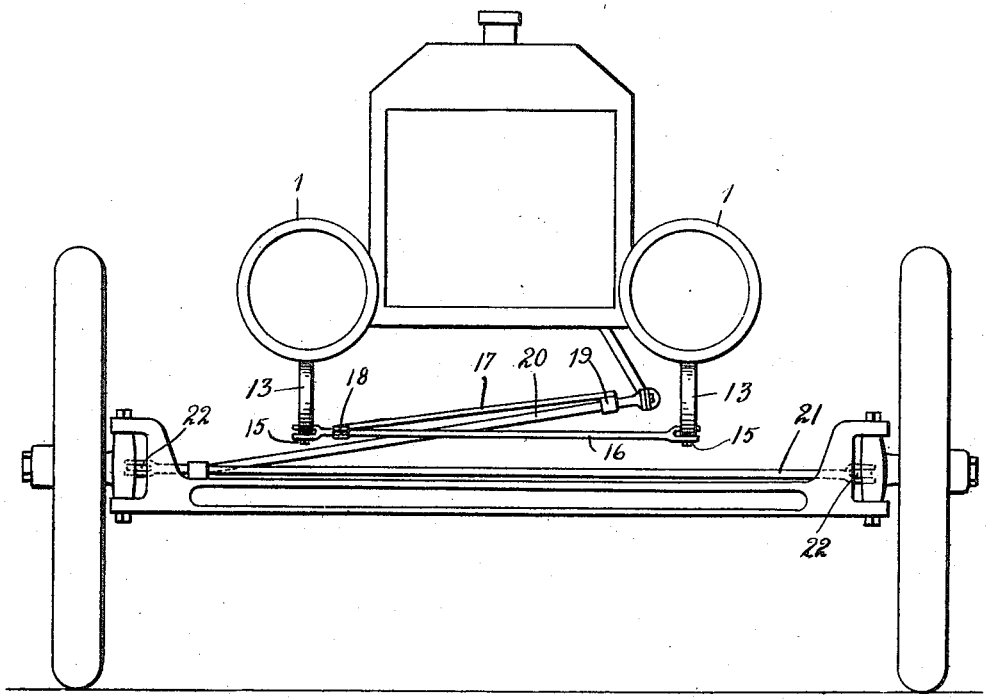
Figure 1 is a front elevation of a sufficient portion of a motor vehicle to illustrate the present invention in its applied relation thereto.
Figure 2:
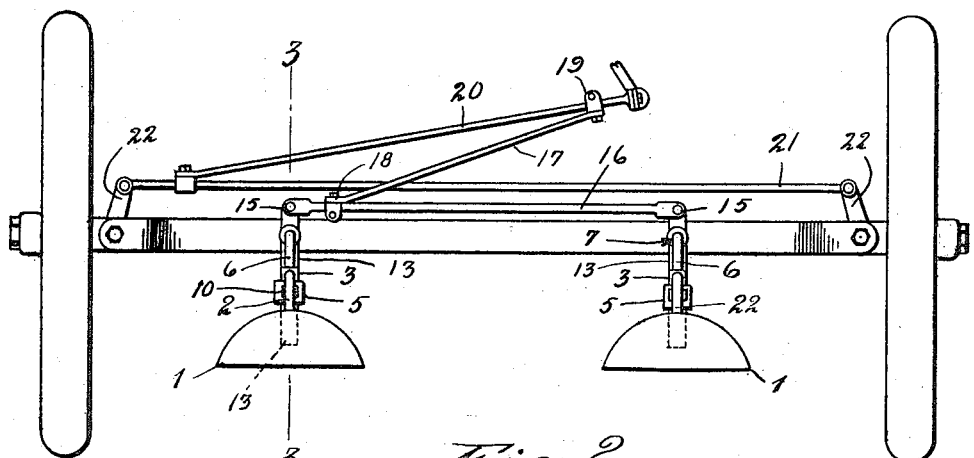
Fig. 2 is a partial plan view of the same.

Referring to the drawings 1 designates a pair of headlamps of ordinary construction but in carrying out the present invention each of said lamps 1 is supported by the forward extremity of an arcuate lamp arm 2 the lower end of which is fixedly secured to a lamp supporting arm 3 extending rearwardly from a post 4 which is mounted to turn on a vertical axis in a bearing cage 5. The cage 5 is carried by the upper and forwardly extended portion 6 of a lamp supporting bracket 7 the lower end portion 8 of which extends in a substantially vertical direction adapting it to be inserted in the ordinary supporting socket found upon motor vehicles. The post 4 is formed in the top and bottom extremities thereof with cone-shaped recesses 9 to receive the cone-shaped or pointed extremities of top and bottom bearing adjustment screws 10 and 11 which are threaded through the top and bottom walls of the cage 5 and secured by means of lock nuts 12.

Connected to each lamp post 4 is a lamp turning arm 13. This arm extends forwardly from the respective post 4 and is then recurved as shown at 14 to extend downwardly and rearwardly where it is connected at 15 to one end of a lamp arm connecting rod 16, the latter being attached to both lamp arms, to cause both lamps to turn at equal angles.

17 designates a coupling rod having one end connected by a clip 18 to the connecting rod 16 and having its other end connected by a clip 19 to the usual coupling rod 20 which extends from the steering arm (not shown) to the steering arm connecting rod 21, the latter being terminally and pivotally connected to the knuckle arms 22 in accordance with the present day motor vehicle practice. The curvature of the lamp turning arms 13 provides the necessary resiliency to allow for the movements of the body or frame of the machine in relation to the front axle and the steering gear.

We claim:—

1. A dirigible headlamp structure comprising, in combination, a pair of headlamps, lamp carrying posts mounted to turn on substantially vertical axes, bearing cages for said posts, a lamp supporting bracket for each bearing cage, a lamp supporting arm extending rearwardly from each post, a lamp arm extending upwardly from said lamp supporting arm and curving forwardly over said bearing cage and having the respective lamp attached thereto, a lamp turning arm extending forwardly from said post, recurved and extended rearwardly under said bearing cage, a lamp arm connecting rod having both lamp arms attached thereto, and a coupling rod having one end attached to said lamp arm connecting rod and having its other end connected to the coupling rod of the steering gear of the vehicle.

2. A dirigible headlamp structure comprising, in combination, a pair of headlamps, lamp carrying posts mounted to turn on substantially vertical axes, bearing cages for said posts, a lamp supporting bracket for each bearing cage, a lamp supporting arm extending rearwardly from each post, a lamp arm extending upwardly from said lamp supporting arm and curving forwardly over said bearing cage and having the respective lamp attached thereto, a lamp turning arm extending forwardly from said post, recurved and extended rearwardly under said bearing cage, a lamp arm connecting rod having both lamp arms attached thereto, a coupling rod having one end attached to said lamp arm connecting rod and having its other end connected to the coupling rod of the steering gear of the vehicle, each lamp post being formed in the top and bottom ends thereof with conical recesses, and bearing adjustment screws having an adjustable connection with the respective cage and having conical ends fitting the recesses in the post.

In testimony whereof we affix our signatures.

HARRY DENOON McLEAN.
CHARLES WARING.

Copies of this patent may be obtained for five cents each, by addressing the "Commissioner of Patents, Washington, D. C."